US012659554B2

(12) United States Patent
Sehgal et al.

(10) Patent No.: US 12,659,554 B2
(45) Date of Patent: Jun. 16, 2026

(54) DYNAMIC METADATA FOR THE MANIFEST

(71) Applicant: DISH Network Technologies India Private Limited, Bengaluru (IN)

(72) Inventors: Sagar Sehgal, Bengaluru (IN); Lohit Huddar, Bengaluru (IN); Yatindra Salian, Bangalore (IN); Chinmay Hegde, Bengaluru (IN); Nitin Gupta, Bangalore (IN)

(73) Assignee: DISH Network Technologies India Private Limited, Bengaluru (IN)

( * ) Notice: Subject to any disclaimer, the term of this patent is extended or adjusted under 35 U.S.C. 154(b) by 0 days.

(21) Appl. No.: 18/824,323

(22) Filed: Sep. 4, 2024

(65) Prior Publication Data

US 2026/0006301 A1     Jan. 1, 2026

(30) Foreign Application Priority Data

Jun. 27, 2024     (IN) ............................. 202441049381

(51) Int. Cl.
*H04N 21/84*          (2011.01)
*H04N 21/845*        (2011.01)
*H04N 21/858*        (2011.01)

(52) U.S. Cl.
CPC ......... *H04N 21/84* (2013.01); *H04N 21/8456* (2013.01); *H04N 21/858* (2013.01)

(58) Field of Classification Search
None
See application file for complete search history.

(56) References Cited

U.S. PATENT DOCUMENTS

| | | | |
|---|---|---|---|
| 6,112,226 A | | 8/2000 | Weaver et al. |
| 6,233,389 B1 | | 5/2001 | Barton et al. |
| 7,197,758 B1 | | 3/2007 | Blackketter et al. |
| 7,801,910 B2 | | 9/2010 | Houh et al. |
| 2002/0131511 A1 | | 9/2002 | Zenoni |
| 2004/0010807 A1 | | 1/2004 | Urdang et al. |
| 2004/0177317 A1 | | 9/2004 | Bradstreet |
| 2005/0262539 A1 | | 11/2005 | Barton et al. |
| 2007/0300249 A1 | | 12/2007 | Smith et al. |
| 2013/0014155 A1* | | 1/2013 | Clarke ................. G11B 27/105 725/32 |
| 2014/0321826 A1* | | 10/2014 | Stelmack ......... H04N 21/47217 386/201 |
| 2016/0173961 A1* | | 6/2016 | Coan ................... H04N 21/8456 725/32 |
| 2018/0152764 A1* | | 5/2018 | Taylor ................ G06Q 30/0623 |
| 2019/0146951 A1* | | 5/2019 | Velmurugan ........... H04L 67/02 707/822 |

(Continued)

*Primary Examiner* — Alexander Q Huerta
(74) *Attorney, Agent, or Firm* — Kilpatrick Townsend & Stockton LLP

(57)          ABSTRACT

A method for dynamic metadata delivery in a content streaming service. The method may comprise receiving, at a computing system and from a client device, a request for a manifest, the manifest comprising links to one or more respective data files. The computing system may access metadata and the links to one or more respective datafiles, the metadata associated with at least one of the one or more respective datafiles. The computing system may generating the manifest comprising the links to the one or more respective data files and the metadata and provide the manifest to the client device.

18 Claims, 8 Drawing Sheets

(56) References Cited

U.S. PATENT DOCUMENTS

| | | | |
|---|---|---|---|
| 2019/0294997 A1* | 9/2019 | Tofighbakhsh | H04N 21/6543 |
| 2020/0302928 A1* | 9/2020 | Sohn | G10L 15/18 |
| 2021/0217413 A1* | 7/2021 | Tushinskiy | H04N 21/2668 |
| 2021/0250396 A1* | 8/2021 | Gandhi | H04N 21/6582 |
| 2022/0191590 A1* | 6/2022 | Sen | H04N 21/4758 |
| 2024/0022782 A1* | 1/2024 | Moore | H04N 21/43072 |
| 2024/0284017 A1* | 8/2024 | Cutaia | H04N 21/47815 |
| 2024/0334025 A1* | 10/2024 | Giladi | H04N 21/2668 |
| 2025/0254380 A1* | 8/2025 | Cockerill | H04N 21/466 |

* cited by examiner

212

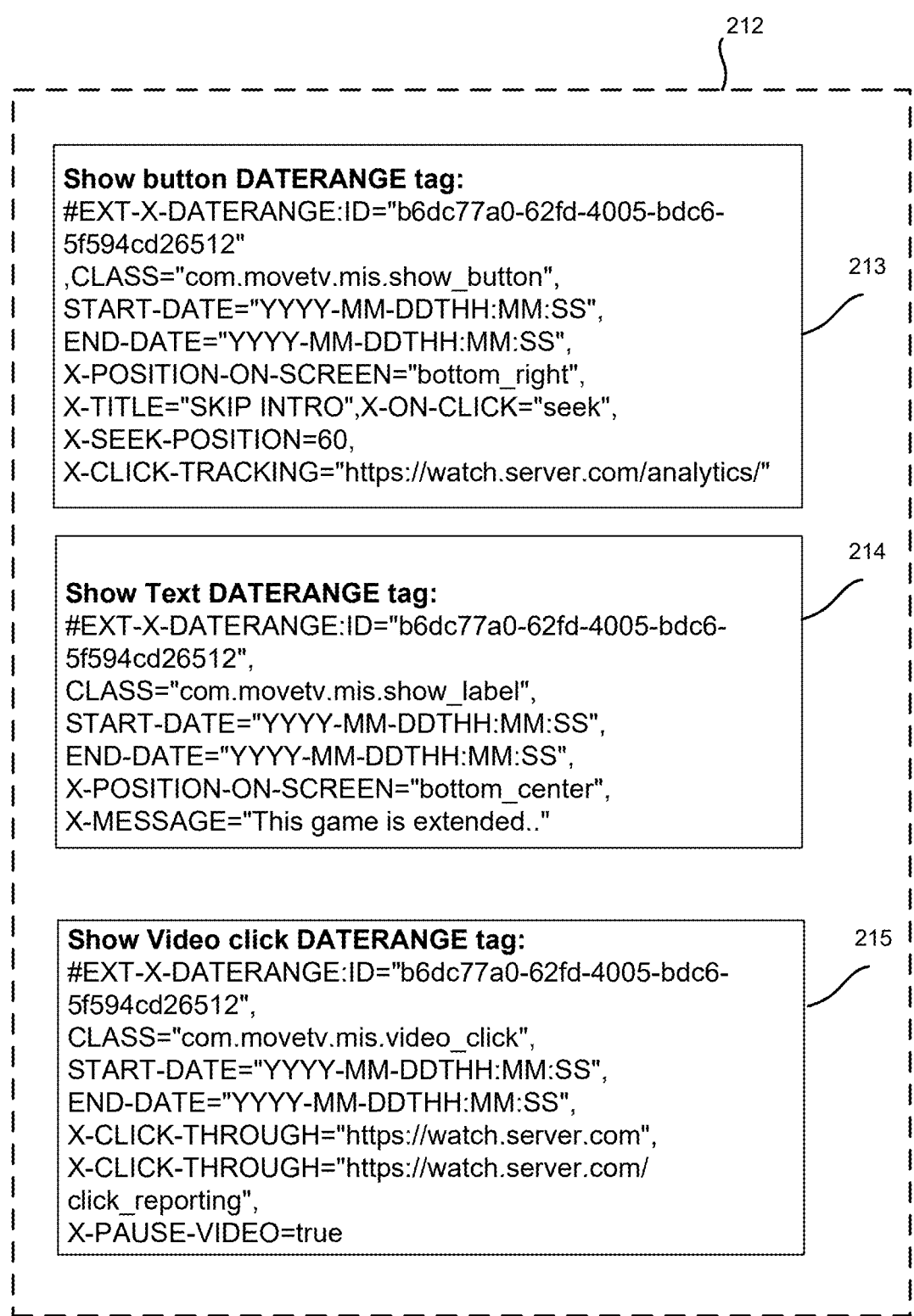

Show button DATERANGE tag:
EXT-X-DATERANGE:ID="b6dc77a0-62fd-4005-bdc6-
5f594cd26512"
,CLASS="com.movetv.mis.show_button",
START-DATE="YYYY-MM-DDTHH:MM:SS",
END-DATE="YYYY-MM-DDTHH:MM:SS",
X-POSITION-ON-SCREEN="bottom_right",
X-TITLE="SKIP INTRO",X-ON-CLICK="seek",
X-SEEK-POSITION=60,
X-CLICK-TRACKING="https://watch.server.com/analytics/"

213

Show Text DATERANGE tag:
EXT-X-DATERANGE:ID="b6dc77a0-62fd-4005-bdc6-
5f594cd26512",
CLASS="com.movetv.mis.show_label",
START-DATE="YYYY-MM-DDTHH:MM:SS",
END-DATE="YYYY-MM-DDTHH:MM:SS",
X-POSITION-ON-SCREEN="bottom_center",
X-MESSAGE="This game is extended.."

214

Show Video click DATERANGE tag:
EXT-X-DATERANGE:ID="b6dc77a0-62fd-4005-bdc6-
5f594cd26512",
CLASS="com.movetv.mis.video_click",
START-DATE="YYYY-MM-DDTHH:MM:SS",
END-DATE="YYYY-MM-DDTHH:MM:SS",
X-CLICK-THROUGH="https://watch.server.com",
X-CLICK-THROUGH="https://watch.server.com/
click_reporting",
X-PAUSE-VIDEO=true

410    Receive a request for a manifest

420    Access metadata and links to one or more data

430    Generate a manifest

440    Provide manifest to client device

500

DYNAMIC METADATA FOR THE MANIFEST

CROSS REFERENCE TO RELATED APPLICATIONS

This application claims priority to Indian Provisional Patent Application No. 202441049381 filed on Jun. 27, 2024, in the Indian Intellectual Property Office, the disclosure of which is incorporated by reference in its entirety for all purposes.

BACKGROUND OF THE INVENTION

With the advent of digital streaming services and the proliferation of on-demand content, users have come to expect a more interactive and personalized viewing experience. This includes personalization of content which is both "live" (e.g., live sports or concerts) or "on-demand" (recorded movies, shows, etc.). However, delivering content requires treating content and metadata as separate entities, leading to challenges in synchronization and integration. This fragmentation complicates the content delivery process, making it difficult to efficiently package and distribute content alongside its relevant metadata.

BRIEF SUMMARY OF THE INVENTION

The disclosed technology provides an integrated single channel to aggregate metadata (timed metadata or other data associated with content), and provides it via a single channel to a client device. The aggregated metadata may be linked or integrated with the content to provide a single channel to the client device. The disclosed technology may include a feedback module to provide information about user interactions to a metadata service or a metadata aggregator.

Aspects of the disclosed technology may include a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Aspects of the disclosed technology may include a method for dynamic metadata delivery in a content streaming service. The method may include receiving, at a computing system and from a client device, a request for a manifest. The manifest may include links to one or more respective data files. The method may include accessing, by the computing system, metadata and the links to one or more respective datafiles. The metadata may be associated with at least one of the one or more respective datafiles. The method may include generating, by the computing system, the manifest may include the links to the one or more respective data files and the metadata. The method may include providing the manifest to the client device. The method may include information configured to interpreted by the client device to render the metadata. The render of the metadata may include rendering an interface. The metadata may include location information indicating a location within content to display a user interface and/or an information window. The metadata may include a timestamp indicating at least one of a start time or an end time. The method may include storing the manifest in a metadata store of the computing system. The method may include receiving data indicating a user interaction from the client device, the user interaction related to metadata or the one or more respective data files. The user interaction is an audio input. The method may include processing, by the computing system, the audio input using natural language processing. The method may include analyzing, by a machine learning model of the computing system, the user interaction. The method may include outputting, by the machine learning model, new metadata based on at least one of voice input, historical user data, or user interactivity data. The method may include retraining the machine learning model based on at least the new generated metadata.

Other embodiments of this aspect include corresponding computer systems, apparatus, and computer programs recorded on one or more computer storage devices, each configured to perform the actions of the methods.

Aspects of the disclosed technology include a system for dynamic metadata delivery in a content streaming service. The system may include a manifest generator. The system may include a metadata service. The system may include one or more processors. The system may include a computer memory may include instructions that, when executed by the one or more processors, cause the system to perform operations to: receive, by the manifest generator and from a client device, a request for a manifest, the manifest may include links to one or more respective datafiles; access, by the metadata service, the links to one or more respective data datafiles and metadata, the metadata associated with at least one of the one or more respective datafiles; generate, by the manifest generator, the manifest may include the links to the one or more respective data files and the metadata; and provide, by the manifest generator, the manifest to the client device. The metadata may include information to be used by the client device to display at least one of an information window or a user interface. The user interface may be configured to receive a user input. Information window may include an advertisement. The metadata service may include a machine learning model configured to output recommended metadata based on at least one of voice input, historical user data, or user interactivity data. The metadata may include a timestamp indicating at least one of a start time or an end time. The system may include receiving data indicating a user interaction from the client device, the user interaction related to metadata or the one or more respective data files.

Aspects of the disclosed technology include a non-transitory computer-readable medium storing instructions configured to be executed by one or more processors. The non-transitory computer-readable medium, when executed by the one or more processors, may cause a method for storing instructions may be configured include receiving, at a computing system and from a client device, a request for a manifest, the manifest may include links to one or more respective data files. The instructions may include accessing, by the computing system, links to one or more respective data datafiles and metadata, the metadata may include a timestamp and associated with at least one of the one or more respective data files. The instructions may include generating, by the computing system, the manifest may include the links to the one or more respective data files and the metadata. The instructions may include providing the manifest to the client device. Other embodiments of this aspect include corresponding computer systems, apparatus, and computer programs recorded on one or more computer storage devices, each configured to perform the actions of the methods.

BRIEF DESCRIPTION OF THE DRAWINGS

The accompanying drawings illustrate embodiments of the disclosed technology and, together with the description, serve to explain the principles of the invention. The drawings are intended to provide a clear understanding of the invention's design, function, and operational advantages, without limiting the invention to the specific embodiments shown.

FIGS. 2A-2D are examples of a system which may be used to generate a manifest file according to aspects of the disclosed technology.

DETAILED DESCRIPTION OF THE INVENTION

Overview

Figure 1:
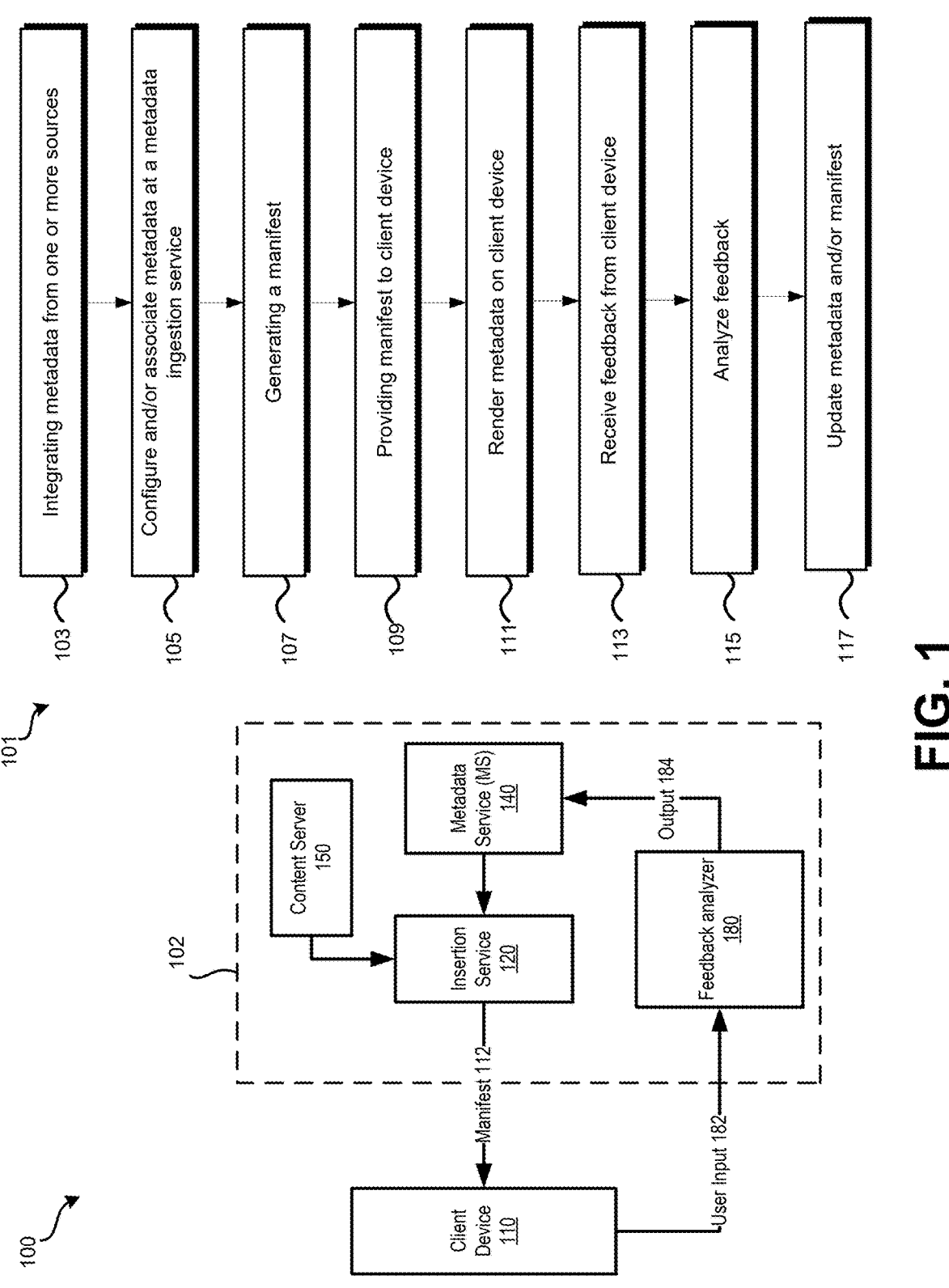
FIG. 1 is an example system and process which may be used for generating a manifest file according to aspects of the disclosed technology.

Content delivery systems often fall short in delivering content along with rich information about the content and/or interaction capabilities with respect to the content. Currently, there are only limited interaction capabilities and static content delivery that does not adapt to individual user preferences. For example, the interaction capabilities may be embedded into a client player configured to receive the content. Current systems may lack the ability to provide advanced features like skip intro, skip recap, and dynamic ad insertion. Current systems also lack the ability to provide additional features related to live content such as replay, messages (e.g., game extended or overtime), or indications related to the content being temporarily unavailable, and other such features.

Currently, these systems provide limited interaction capabilities and rely on static content delivery that does not adapt to individual user preferences. For instance, the interaction functionalities available are often restricted to the basic controls of the media player receiving the content, such as play, pause, and stop.

Additionally, metadata is provided via a different delivery mechanism than the mechanism providing the underlying content. Thus, the metadata related to the content and the underlying content may be fragmented. For example, content may be delivered without the metadata being available due to different delivery mechanisms. Content may be delivered without the corresponding metadata being available simultaneously. This fragmentation may mean that users may access the content without the enhanced features that metadata could provide.

Additionally, when there is an underlying change to the content (e.g., the content being extended, live content with no fixed end point or start point), different mechanisms for delivery of the content and the metadata related to the content may lead to a mismatch, and the metadata may not be aligned with the delivered content. For content that changes dynamically, such as live broadcasts with no fixed end or start point, the different delivery mechanisms for content and metadata can result in a mismatch. This can cause the metadata to be misaligned with the actual content being viewed. For example: in live sports events, metadata indicating scores or game statuses might not match the live broadcast due to delays or changes in the event's timeline. In streaming services, extended content (e.g., extended cuts or director's versions) may not have synchronized metadata, leading to an inconsistent user experience. As another example, a live concert being streamed may have variations in the song being sung, a key event in the concert, the length of the live concert, etc., which would require dynamic content being generated.

To address at least these, and other limitations, there is a need for an integrated delivery system that can provide both content and metadata in a synchronized manner. Such a system may ensure real-time synchronization of the metadata with the underlying content. As one example, metadata may be updated or provided in real-time to reflect changes in the content, providing accurate information and interaction capabilities. Additionally, user interactions may be enhanced, without the need for a separate mechanism for certain features (e.g., skipping portions of the content (e.g., an introduction or advertisement)). Example features which may be provided may include skip introduction, skip recap, dynamic ad insertion, and live content functionalities. Additionally, the content and the metadata being delivered through a unified mechanism may ensure consistency and reduce the risk of fragmentation.

Example Systems and Methods

The following examples illustrate various embodiments of the disclosed technology, aligned with the figures previously described, offering a detailed view of how the system operates within various settings. In some examples, tags and metadata may be used interchangeably to refer to one or more messages which contain metadata. In some examples, a tag may be a message or format in which metadata is structured in a specified manner.

FIG. 1 illustrates a system 100 and a process 101 related to providing a manifest file and metadata, according to certain embodiments. The system 100 may include a computing device 102 and a client device 110. The computing device 102 may comprise one or more components, such as an insertion service 120, a metadata service (MS) 140, a metadata service (MS) store 160, a content server 150, and a feedback analyzer 180.

Computing device 102 may be one or more computing devices which contain hardware and/or software to perform the functions described herein. Computing device 102 may be any combination and may include, for example, one or more databases, servers, virtual machines, cloud architecture, virtual containers, etc. The various components described with respect to computing device 102 may be instantiated on the same hardware, physical machines, and/or virtual machines. Computing device 102 may be in data communication with the client device 110. Computing device 102 may both send and receive messages from the client device 110, including a manifest, metadata, content, content links, content pointers, user input, user feedback (e.g., voice, eye tracking, camera input, gestures, etc.). Computing device 102 may comprise a content server 150 which may be in communication with an insertion service 120, a metadata service 140 which may provide metadata to the insertion service 120, and the feedback analyzer which may obtain user input and provide output to the metadata service 140.

Content Server 150 may store and/or serve video or other multimedia content. In some examples, content stored in the content server 150 may be identified by pointers and/or links. These pointers and/or links may point to a segment of content which may be stored on the content server 150. This segment of content (e.g., a fixed interval of a few seconds of audio-visual content) may be transmitted at a particular time from the content server 150 to the client device 110. This allows the content server 150 to deliver content which is immediately needed at the client device 110 (e.g., a segment of a video, a segment of a song, a segment of a virtual reality world, a portion of software, context-specific augmented reality information). In this manner, the entirety of the content does not need to be provided at once. The content server 150 may also include and/or be in connection with one or more databases which may store content being requested. The content in the content server 150 may be combined at the insertion service 120, which may allow for a single message to be sent from the insertion service 120 to the client device 110, which contains both metadata and content related information. The single message may be, for example, a single message and/or single manifest for the client player. The content server 150 may manage a library of digital assets, which includes video, audio, images, and other multimedia content. It may keep these files organized and readily accessible for streaming. In some examples, the content may be identified by a unique identifier. The content server 150 may work in conjunction with a content delivery network (CDN) to distribute the content in a manner which is geographically closer to users or lower in latency time with respect to a user using the client device 110. This may in turn reduce latency and buffering times for a smoother viewing experience. Content stored within or associated with the content server 150 may be identified by a unique content identifier. The unique content identifier may allow for variations in languages, audio, length of content (e.g., an extended movie versus a shortened version of a movie), aspect ratios, etc.

In some examples, the content server 150 may be located as part of the computing device 102. In other examples, the content server 150 may be located or not part of the computing device 102. In such examples, the link to the content, which may be integrated in the manifest file, may identify how to retrieve the content on the content server 150.

The insertion service 120 may be a module and/or service configured to generate manifests. The insertion service 120 may also be configured to perform metadata insertion into the content/manifests. SSAI may integrate content and metadata into a single package, utilizing a 'daterange' tag, (e.g., using an HLS (HTTP Live Streaming)) format, which may facilitate dynamic content features such as ad insertion based on user context or content being watched.

The insertion service 120 may be responsible for creating and/or modifying a manifest file. The manifest file may be a playlist of content that the client device 110 uses to determine how to access content, retrieve content (e.g., through a link and/or pointer to a content source), and what to download and play. The manifest file may contain additional content and/or pointers to additional content and/or allowable types of content (e.g., formats, types of metadata, types of content, etc.). The insertion service 120 can dynamically insert ads and/or pointers into a manifest, or repackage content in a manner which may allow for a smooth transition between a chosen piece of content and other content (e.g., advertisements, other videos, other metadata, emergency messages).

The insertion service 120 may package content and metadata into a single stream or package. The insertion service 120 may aligning the advertisement and/or metadata bitrate, resolution, and format with the main content to ensure consistency and prevent playback issues. As one example, in the context of HTTP Live Streaming (HLS), the insertion service 120 may use 'daterange' tags as defined in the HLS protocol to signal where metadata, ads, product links, etc. may be inserted. These tags may be used to mark the start and end times of ad breaks, allowing the client device 110 to know when to switch from content to ads and back. In some examples, the insertion service 120 has the capability to track ad performance metrics such as impressions and click-through rates, utilizing custom attributes such as, for example, "X-CLICK-TRACKING" in the 'daterange' tag elements described with respect to FIG. 2C. This data may be useful for advertisers and content providers to measure the effectiveness of their ad campaigns. Additionally, in some examples, the insertion service 120 may be contextually aware, meaning it can insert ads that are relevant or ranked based on the content being watched on the client device 110, enhancing the viewer's experience and the ad's impact.

The insertion service 120 may be responsible for creating or modifying the manifest file, which may be a playlist of content that the client player uses to determine what to download and play. The insertion service 120 may dynamically insert ads into this manifest in a way that allows for a smooth transition between the main content and advertisements. The insertion service 120 may package content and metadata into a single stream or package. In the context of HTTP Live Streaming (HLS), the insertion service 120 may use 'daterange' tags as defined in the HLS protocol to signal where ads should be inserted. These tags may be used to mark the start and end times of ad breaks, allowing the client player to know when to switch from content to ads and back. In some examples, the insertion service 120 has the capability to track ad performance metrics such as impressions and click-through rates, utilizing custom attributes like X-CLICK-TRACKING mentioned in the 'daterange' tag elements above with respect to FIG. 2C. This data may be useful for advertisers and content providers to measure the effectiveness of their ad campaigns. Additionally, in some examples, the insertion service 20 may be contextually aware, meaning it can insert ads that are relevant to the content being watched, enhancing the viewer's experience and the ad's impact.

The metadata service 140 may be a service or module which may be configured to ingest and configure metadata. In some examples, the metadata service 140 may act as an intermediary storage or database for metadata which has been transformed and/or modified in a particular manner. For example, the metadata service 140 may aggregate various metadata, along with timestamps, to generate a single manifest file for each content asset, which uniquely identifies the content. The metadata service 140 may ingest or store metadata from various metadata sources, such as metadata curation services, and/or from feedback analyzer 180. In some examples, the metadata service 140 may comprise one or more databases, services, and/or modules. A manifest file may be a master manifest file or a variant manifest file. In the context of "live" streaming, a series of manifest files may be transmitted as the content is updated and provided (e.g., during a concert or a live sports game). In such examples, the master manifest file may initiate the live content, while additional manifest files may be periodically transmitted (e.g., every five seconds, every 10 seconds, etc.) to update the stream of live content.

The metadata service 140 may include or be in communication with one or more metadata curation services. Metadata curation services may be managed by third parties and can add any arbitrary metadata to the content. This could be additional information or ads, especially useful for live content where new data can be incorporated in real-time. In some examples, metadata curation service(s) may be linked to a machine learning model to assist with ranking features or content which may be provided via metadata. These can include advertisements, links to products, modules to be run, or other items. In the context of live programs, meta curator services can detect changes in the program duration and propagate this event via a metadata ingestion service (MIS) service. The client device 110 can use this information to notify the user in the form of toast message and also to update the UI state where the program information is displayed.

The metadata service 140 may include a metadata ingestion service (MIS) store which may store data after aggregation from one or more metadata sources (e.g., metadata curation services). Each metadata curation service may provide metadata, which may be ingested and stored at an MIS store. The MIS store may organize the metadata by type (e.g., advertisements, information about the content, etc.).

The feedback analyzer 180 may collect and analyze data regarding user interactions with the content and metadata. It may include a machine learning model to refine content recommendations and/or ad targeting based on user behavior. It may form a feedback loop with other system components, such as the metadata service 140 and the insertion service 120, to adjust content delivery and/or ad placement strategies based on user feedback. The feedback loop may thus provide additional metadata to the metadata service 140. The feedback analyzer 180 may also data on how users interact with both the content and the user interface of the client device 110 (or other user interactions, such as through a voice). These interactions may include actions like play, pause, rewind, fast-forward, ad clicks, skip intro, and even the user's response to specific content recommendations.

The feedback analyzer 180 may also employ algorithms to examine the collected data to understand user behavior patterns. For example, it may identify which ads are frequently skipped, what types of content have higher engagement rates, and at what points viewers tend to stop watching or interacting with a piece of content. It may also incorporate machine learning models that learn from the data over time, enabling the system to predict user preferences and improve content recommendations and ad targeting.

The client device 110 may be a set top box, a tablet, a smartphone, a smart device, a computing device, a mobile device, and/or other user device. Client device 110 may obtain and/or metadata, tags, and/or a manifest such as those described with herein with respect to FIG. 2C, to provide multimedia or content to a user. This information may also provide or obtain for a link to a content source. The tags may be provided through a single channel or source on computing device 102 to allow for integration of content and additional features which may be enabled through the tags (e.g., skipping, moving to a certain chapter, watching highlights, polls, changing languages, skipping dance sequences within a movie) in a single tag. Thus, the tags may provide both metadata and content (or access to content) in a single package.

The client device 110 may be capable of understanding various manifests (e.g., master manifest and/or variant manifest) and content formats (e.g., video formats, music formats, etc.) This may allow the client device 110 to be compatible with different streaming protocols and media types, and allow the client device to cause various types of content to be interpreted and displayed. This may include, for example, different resolutions, codecs, container formats, player formats, etc. to ensure a broad range of content can be played. The client device 110 may support adaptive bitrate streaming protocols such as HLS (HTTP Live Streaming), which may allow for a smooth viewing experience by adjusting the quality of the video stream in real-time based on the user's internet speed and device performance.

The client device 110 may also process and respond to metadata which is integrated or provided along with content. For example, and as further explained herein, client device 110 may recognize 'daterange' tags and accordingly cue specific actions like skipping intros, jumping over recaps, or playing ads without disrupting the content flow. Additionally, the client device 110 may receive or display interactive elements such as on-screen buttons or links triggers by metadata. The client device 110 may also capture user interactions with the content or user interface, such as voice comments or other user interactions.

At 103, the computing device 102 may integrate and/or configure metadata from one or more sources. The one or more sources of metadata may comprise one or more metadata curation services. In some examples, the integration of the metadata may include aggregating metadata from various metadata curation services. The various metadata curation services may include third party metadata providers, such as for example, advertisers, analytics providers, translation services, governmental agencies, etc. The metadata may be stored in a MIS store prior to being configured and/or integrated by the computing device. At 103, the metadata may also be configured to include a particular format, a time stamp, and/or other information (e.g., a particular format, user preferences, a particular language, etc.). The MS 140 may also receive an output 184 from a feedback analyzer, which may be used to produce and/or modify other metadata. The output 184 may be the output of a machine learning model.

At 105, the computing device may associate the metadata with one or more content files. For example, the integration service 120 may associate the metadata with one or more content files which is associated with content server 150. Each of the content files may be uniquely identifiable by the content server 150. The metadata may also contain time-based information which is related to the content files, e.g., when to display metadata with respect to underlying content, how long to display the metadata, when and/or how the metadata may affect the playing of the content (e.g., such as insertion of an ad or skipping an ad).

At 107, the computing device 102 may generate a manifest 112. The manifest 112 may be a manifest file, which may be a file containing information for a group of accompanying files that are part of a set or coherent unit. The manifest 112 may be a variant manifest (e.g., a 4 k manifest, a 1080p manifest, a manifest in specific language (Hindi, Punjabi, Spanish, German, English, etc.) or a master manifest. The manifest 112 may provide both information related to the content and associated metadata. also contain information related to the content server.

At 109, the manifest may be provided from the computing device 102 to the client device 110. The manifest 112 may thus be a single file which is provided to the client device. In some examples, the manifest 112 may be provided to the client device 110 in response to a request from the client device 110. For example, the client device 110 may request the manifest 112 upon launching an application on the client device 110. The launched application on the client device 110 may be a content streaming application, allowing a user to access live TV, sports, movies, films, and other audiovisual and/or multimedia content. In some examples, a different manifest file may be requested by the client device 110 for different applications. As another example, the other application may be an augmented reality application, which may be configured to access, process, and render different content than the content streaming application. The augmented reality application may request a different manifest which may relate to the content. In some examples, the manifest 112 provided to the client device may depend on the type of the client deice 110 (e.g., a set top box, a laptop, a smartphone, a smart home speaker, etc.).

At 111, the client device 110 may receive the manifest, process the manifest, and/or display the metadata on the client device based on the manifest received. For example, the manifest 112 may have contained therein information which relates to both the content delivered as well as to the metadata. The client device 110 may parse the metadata, which may been part of the manifest file and/or related to the manifest file. The metadata may have timing information, rendering information, and/or content identifier information, which may allow the metadata to be rendered on the client device 110. The client device 110 may also receive one or more digital files related to a uniquely identified piece of content. The client device 110 may process the digital files received in parallel with the processing of the metadata. This may allow the metadata to be rendered and displayed synchronously with the content files. For example, timing information within the metadata may relate to timing information in the underlying content, allowing metadata to be rendered and displayed to correspond with portions of the underlying content (e.g., skipping an introduction, providing advertisements, providing translations or subtitled, displaying information about an actor, etc.). The client device 110 may also provide and/or process content to provide information.

At 113, feedback may be received from the client device as user input 182. The user input 182 may be provided by a user at the client device and may relate to the content and/or metadata being displayed. For example, the user input 182 may be input such as an interaction with specific metadata, voice commands, other voice inputs related to the underlying content (e.g., voice input indicating "this action sequence was great" or "this song is the best in the movie."). The user input 182 may be transmitted to the feedback analyzer 180 to further analyze the user input 182. In some examples, the user input 182 may be the user rewatching, pausing, rewinding, or fast forwarding through certain sections of the content.

At 115, the feedback may be analyzed at the feedback analyzer 180. The feedback analyzer 180 may contain one or more modules and/or systems to analyze the feedback. For example, the feedback analyzer 180 may contain a natural language processing unit, a machine learning module (MLM), a timing analyzer system, an interactivity analysis system.

At 117, the metadata and/or manifest may be updated. In some examples, the update may be based on the feedback received from the feedback analyzer 180. At this block, the metadata and/or manifest may be updated for a specific content identifier. For example, a particular piece of content may be in "extended" time (e.g., a sports match) which may, when in the extended time period, contain metadata to indicate that the match is extended (e.g., "the match is in overtime.") Other visual cues may also be provided to indicate that the match is in overtime. In other examples, during periods where the match is paused or in between parts of the match, the metadata may contain a message indicating that the content is currently unavailable or paused, and that the content will resume.

Figure 2A:
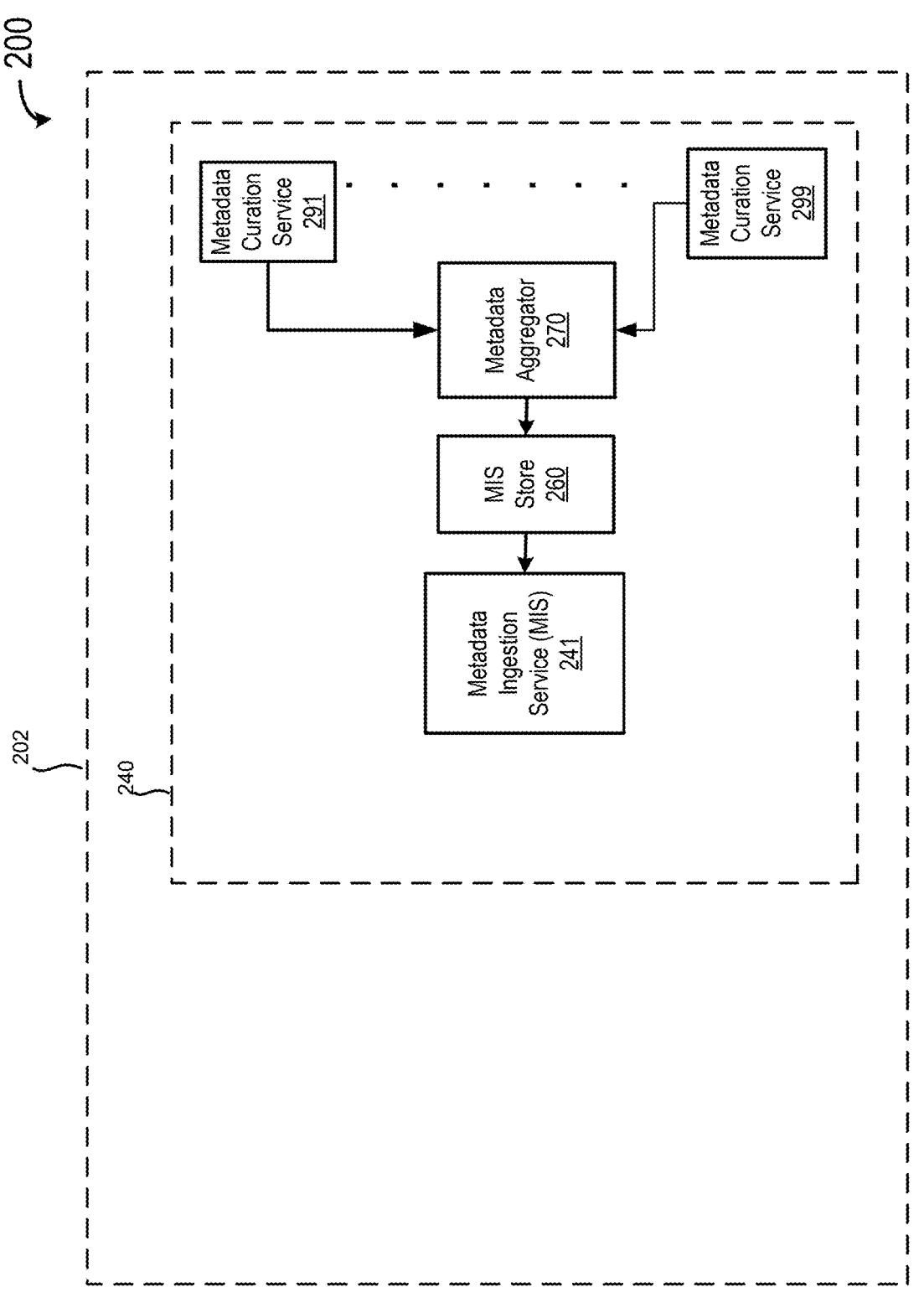
Figure 2B:
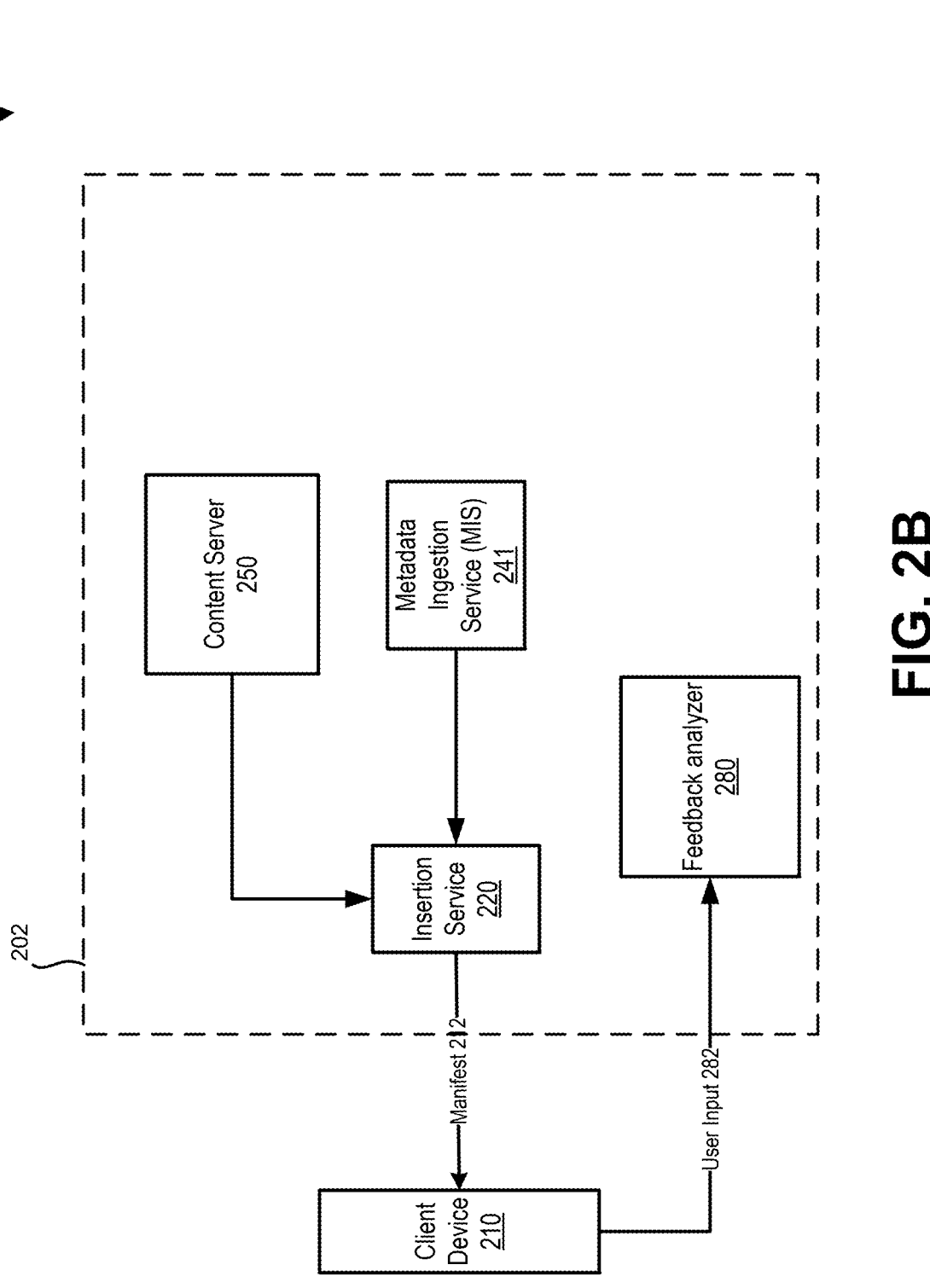

FIGS. 2A-2C illustrate a system 200 for integrating content and metadata into a single file, according to certain embodiments. The single file may be provided through a single channel to a client device. The single file may be a manifest file, which may include both the metadata and access to the content (e.g., through a link, pointer, or other mechanism). The system 200 may be similar to some or all of the system 100 described in FIG. 1. The system 200 may include a computing system 202 with one or more components, such as metadata service (MS) 240, an insertion service 220, a metadata ingestion service (MIS) 241, a metadata service (MS) store 260, a content server 250, and a feedback analyzer 180, a metadata service (MS) 240, and a client device 210, and metadata curation services 291-299.

Referring to FIG. 2A, the metadata service (MS) 240 may be a service which may be comprised of one or more services and/or components. For example, the metadata service 240 may include the MIS 241, the MS store 260, the content server 250, and metadata curation services 291-299. The metadata curation services 291-299 may include third party metadata providers, such as for example, advertisers, analytics providers, translation services, governmental agencies, etc. Each of the metadata curation services 291-299 may be in data communication with one or more external databases and access information from the internet. The metadata curation services may include, for example, a social media feed, a live events feed, a weather feed, etc., which all may provide information to a specific metadata curation service.

The metadata curation services 291-299 may be services which may be managed by third parties and can add any arbitrary metadata to the content. In some examples, this may include additional information or ads, which may be especially useful for live content where new data can be incorporated in real-time. In some examples, metadata curation service(s) may be linked to a machine learning model to assist with ranking features or content which may be provided via metadata. These can include advertisements, links to products, modules to be run, or other items. In the context of live programs, meta curator services can detect changes in the program duration and propagate this event via the MIS service. The client player 210 can use this information to notify the user in the form of a message and also to update the user interface (UI) state where the program information is displayed.

The metadata aggregator 270 may aggregate metadata from the one or more of the metadata curation services 291-299. The metadata aggregator 270 may deduplicate, combine, modify, temporarily store, check for updates, process missing portions, etc. of metadata which may be received from the one or more metadata curation services 291-299. For example, if certain metadata is in an improper format or missing information for the metadata to be rendered, the metadata aggregator 270 may check and/or correct for such deficiencies with metadata. The MIS store 260 may store metadata in a format which is accessible, such as a relational database. The MIS 241 may ingest or access from a database of metadata which is to be used or associated with a particular content. The MIS 241 may further provide metadata which it accesses, filters for, or searches for to another service.

Referring to FIG. 2B, the MIS 241 may provide the metadata to the insertion service 220. The insertion service 220 may modify the metadata into a format and integrate and/or insert the data into a manifest, along with one or more unique content identifiers. The one or more unique content identifiers may be provided by and/or access through the content server 250. The insertion service 220 may thus prepare the manifest 212, which may be similar to the manifest 112. The manifest 212 may be a manifest file, which may be a file containing information for a group of accompanying files that are part of a set or coherent unit. The manifest 212 may be a variant manifest (e.g., a 4 k manifest, a 1080p manifest, a manifest in specific language (Hindi, Punjabi, Spanish, German, English, etc.) or a master manifest. The manifest 212 may provide both information related to the content and associated metadata and may also contain information related to the content server. The manifest 212 may be provided based on a request the client device 210. The client device 210 may first make a request to the computing system 202, which may, in some examples, be directed to the insertion service 220. The client device 210 may provide the manifest 212 responsive to the request by the client device 210.

The client device 210 may be a set top box, a tablet, a smartphone, a smart device, a computing device, a mobile device, and/or other user device. Client device 210 may obtain and/or metadata, tags, and/or a manifest such as those described with herein with respect to FIG. 2C, to provide multimedia or content to a user. This information may also provide or obtain for a link to a content source. The tags may be provided through a single channel or source on computing system 202 to allow for integration of content and additional features which may be enabled through the tags (e.g., skipping, moving to a certain chapter, watching highlights, polls, changing languages, skipping dance sequences within a movie) in a single tag and/or through a single manifest file containing multiple tags. Thus, the tags may provide both metadata and content (or access to content) in a single package. Client device 210 may also process and respond to metadata which is integrated or provided along with the manifest, such as for example, within the manifest 212. For example, and as further explained herein, the client device 210 may recognize 'daterange' tags and accordingly cue specific actions like skipping intros, jumping over recaps, or playing ads without disrupting the content flow. Additionally, the client player may receive or display interactive elements such as on-screen buttons or links triggers by metadata. The client player may also capture user interactions with the content or user interface, such as voice comments or other user interactions. In some examples, additional metadata may be provided to the client device on an ad-hoc basis when additional or new metadata has been generated or provided. For example, a social relevance aggregator may determine which actors within a movie are the most popular, and provide metadata (e.g., advertisements) which are centric to that actor's presence within the movie. Thus, the metadata may be inserted or provided to the client device at any point through a manifest file.

The client player 210 may also provide information to the feedback analyzer 280 as a user input 282. The user input 282 may be similar to the user input 182 described above. The user input 282 may be provided by a user at the client device and may relate to the content and/or metadata being displayed. For example, the user input 282 may be input such as an interaction with specific metadata, voice commands, other voice inputs related to the underlying content. The feedback analyzer may analyze the user input to provide that information to the one or more metadata curation services 291-299 illustrated with respect to FIG. 2A. In some examples, the user input 282 may be the user rewatching, pausing, rewinding, or fast forwarding through certain sections of the content.

FIG. 2C illustrates various tags, 213-215. Are illustrated for clarity, it is to be understood that other variations of the tags may be present. These tags may be used in an HLS format (HTTP Live Streaming) and be used to signal the insertion of timed metadata into a single media stream. This may be useful to synchronize or provide additional information regarding. The tags 213-215 may be "Date Range Tags," but other types or structures of tags are possible. Although examples are provided, other structures for streaming protocols and tags may be used. These tags may be part of a manifest. The manifest file may contain the tags which are described herein. In some examples, the tags may be transmitted independently of the manifest file (e.g., a tag or metadata which relates to an emergency broadcast).

As further explained below, the various tags or metadata may allow for functionality. This may include for example, interactive ads based on a brand or product recognition, including relevant inline interactive advertisements. Key highlights of content, such as a game, may be curated and crowd sourced tags. This may include for example, key moments such as a goal being scored, a touchdown, a certain score being hit, or another contextual event. Changes in the program timeline may occur for a change in the program and this may be displayed to a user without changes to the underlying live program or without the need for a separate delivery mechanism. Other examples of features which may be enabled by the metadata may include skipping introduction (e.g., bypassing the introductory segments of a series or movie); skipping recap (allowing users to skip over recap segments that summarize previous episodes); dynamic ad insertion (the capability to insert targeted advertisements dynamically based on user preferences and behaviors); live content features (e.g., functionalities for live content, such as instant replay, real-time messaging (e.g., notifications about game extensions or overtime), alerts about the content being temporarily unavailable, data about the underlying content (e.g., a song being played in a live concert)).

The tag 213 may be a "Show button" tag, which can allow a button to be illustrated or viewed on content at a particular position. Tag 213 may be configured to display a specific interactive button on the client device. The following characteristics or elements may be comprised within the tag 213.

EXT-X-DATERANGE: This may indicate the start of a Date Range tag.

ID: A unique identifier which may provide a unique ID for the Date Range instance. It is used to uniquely identify the tag.

CLASS: A user-defined class of Date Range tags that share the same attributes or behavior.

START-DATE and END-DATE: These specify the start and end times of the segment that the metadata applies to, using the ISO 8601 date and time format.

X-POSITION-ON-SCREEN: A custom attribute which may define where on the screen the button will appear (e.g., "bottom_right").

X-TITLE: A custom attribute which may specify the title of the button (e.g., "SKIP INTRO").

X-ON-CLICK: A custom attribute which may define the action to take when the button is clicked (e.g., "seek").

X-SEEK-POSITION: An attribute which may indicate the position in the video content to seek to when the button is clicked.

X-CLICK-TRACKING: A custom attribute which may provide a URL for reporting analytics when the button is clicked.

The tag 214 is a "Show button" tag, which can allow a button to be illustrated or viewed on content at a particular position. In addition to the characteristics or elements described above, the following characteristics, elements, or components may be comprised within the tag 214.

CLASS: Here, "com.movetv.mis.show_label" may indicate that this tag is for displaying a text message on the screen.

X-POSITION-ON-SCREEN: In this example, "bottom_ center" which may position the message at the bottom center of the screen. This may indicate the position of an element on the screen.

X-MESSAGE: This may be the actual message to be displayed (E.g., "This game is extended . . . overtime is now going on . . . please stay tuned!").

The tag 215 may be a "Show button" tag, which can allow a button to be illustrated or viewed on content at a particular position. The following characteristics or elements may be included in the tag 215.

CLASS: "com.movetv.mis.video_click" may imply that this tag classifies a video segment that can be clicked.

X-CLICK-THROUGH: This may provide the URL(s) where the viewer will be taken upon clicking the video segment. This URL may be the source of the next content block.

X-PAUSE-VIDEO: A boolean which may indicate whether the video should pause when the video segment is clicked (in this case, true).

Figure 2D:
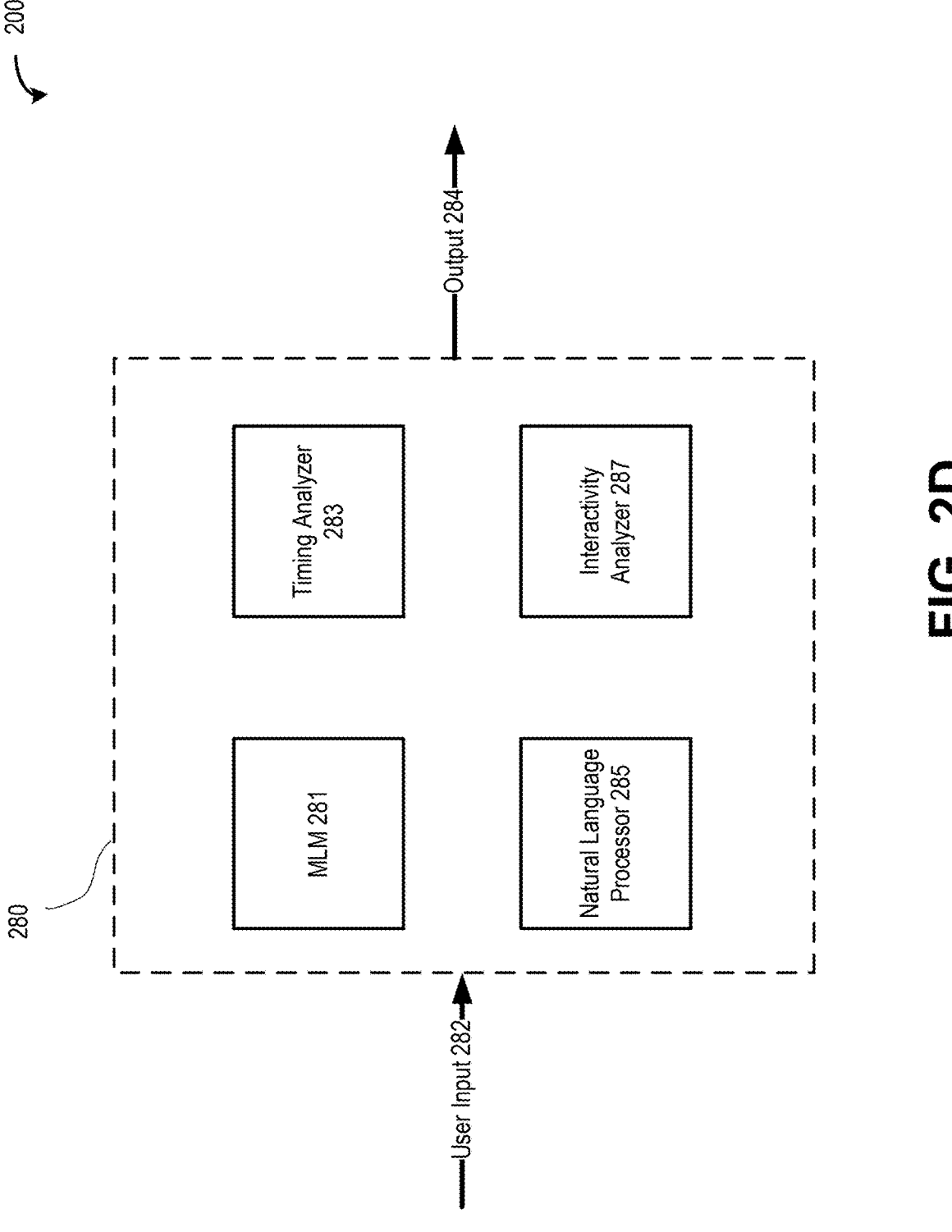

FIG. 2D illustrates additional aspects of system 200. The client device 210 may generate and/or provide the user input 282 which may be classified and/or feedback analyzer 280. The feedback analyzer 280 may provide an output 284. The output 284 may be used to update and/or generate additional metadata. The feedback analyzer 280 may contain a machine learning module 281, a timing analyzer 283, a natural language processor 285, and an interactivity analyzer 287.

The user input 282 may be similar to the user input 182. For example, the user input 282 may be provided by a user at the client device and may relate to the content and/or metadata being displayed. For example, the user input 282 may be input such as an interaction with specific metadata, voice commands, other voice inputs related to the underlying content (e.g., voice input indicating "this action sequence was great" or "this song is the best in the movie."). In some examples, the user input 282 may be the user rewatching, pausing, rewinding, or fast forwarding through certain sections of the content. The output 284 may be similar to the output 184. The output may include data and/or other information which may allow for the generation of metadata. In some examples, the output 284 may be metadata itself, which may be inserted or provided in a live stream.

The machine learning module 281 may be a block which includes one or more machine learning models (MLMs) employed within the feedback analyzer 280. These models, which may include convolutional neural networks (CNNs), support vector machines (SVMs), and random forests, further refine the classifications. CNNs may be particularly effective for image classification tasks due to their ability to automatically detect important features within images. SVMs are useful for high-dimensional spaces and are effective when the number of dimensions exceeds the number of samples. Random forests, an ensemble learning method, operate by constructing a multitude of decision trees and outputting the class that is the mode of the classes of the individual trees.

In some examples, the machine learning module 281 may include algorithms to allow for the selection of a model based on the hardware and/or software of the client device 210. In this manner, the machine learning module 272 may contain a variety of MLMs, which may be updated and selected based on the hardware and/or software of the computing device 202 in which the machine learning module 272 is located, stored, and/or instantiated.

The timing analyzer 283 may contain algorithms which can analyzer user feedback with respect to content from the client device 210. The timing information may relate to, for example, a user skipping content, fast forwarding through content, the underlying type of content related to the user feedback (e.g., a song, a dance sequence, a sports sequence within a movie, a music video, the underlying actor or character, graphic sequences, etc.). Timing information may be obtained with respect to the underlying content to allow specific time based points to be points at which metadata may be requested. For example, if a certain portion of a content is skipped above a threshold amount (e.g., more than 10% of users skip the content), the start and end time for that portion may be used to provide a "skip" type of metadata. The type of underlying content may be analyzed, such as by MLM 281, to provide the type of content (e.g., Bollywood dance sequence). Thus, metadata may be generated which may provide "skip dance sequence," at the start of the dance sequence, which allows a user to then skip to the end of the dance sequence and continue with the content otherwise. As another example, a user may replay a particular goal or touchdown within a scoring match. This may be a short segment of the sports match. This information may be analyzed.

The natural language processor (NLP) 285 may be used to analyze audio information from the underlying content and/or speech obtained from the client device 210 by a user. The NLP 285 may include technology to facilitate the interaction between humans and computers using natural language by humans and/or outputs by a computer. The NLP 285 may also contain other software and/or hardware which may allow for conversion of speech and/or to text, such as specific machine learning models to perform the conversion.

The NLP 285 may contain rule-based methods, statistical methods, machine learning and/or AI models, and deep learning models (e.g., neural networks, including recurrent neural networks (RNNs) and transformers, to handle complex language tasks).

The interactivity analyzer 287 may analyze how often users interact or use one or more metadata based interaction windows (e.g., skip ads, skip sequence, go to middle, go to end, etc.). The interactivity analyzer 287 may be designed to measure and evaluate the level of interactivity across various client devices. The interactivity analyzer 287 may thus provide metrics on which metadata or types of meta are not engaged with by users. The interactivity analyzer 287 may also provide more information on "click through" ads, and which products or ads have more engagement.

The feedback analyzer 280 may provide an output 284. Output 284 can be metadata which is provided to one of the metadata curation services 291-299. In some examples, the output 284 may be a command or message to delete, remove, and/or deactivate certain types of metadata. In some examples, such as when a game is extended, the feedback analyzer 280 can generate an automatic message or metadata, which is provided as a feedback loop, and shown as a high priority message on the content. For example, during live games, this may be done automatically. In other examples, the feedback analyzer 280 may also provide information about the underlying content if deemed trending or useful by a population.

Figure 3:
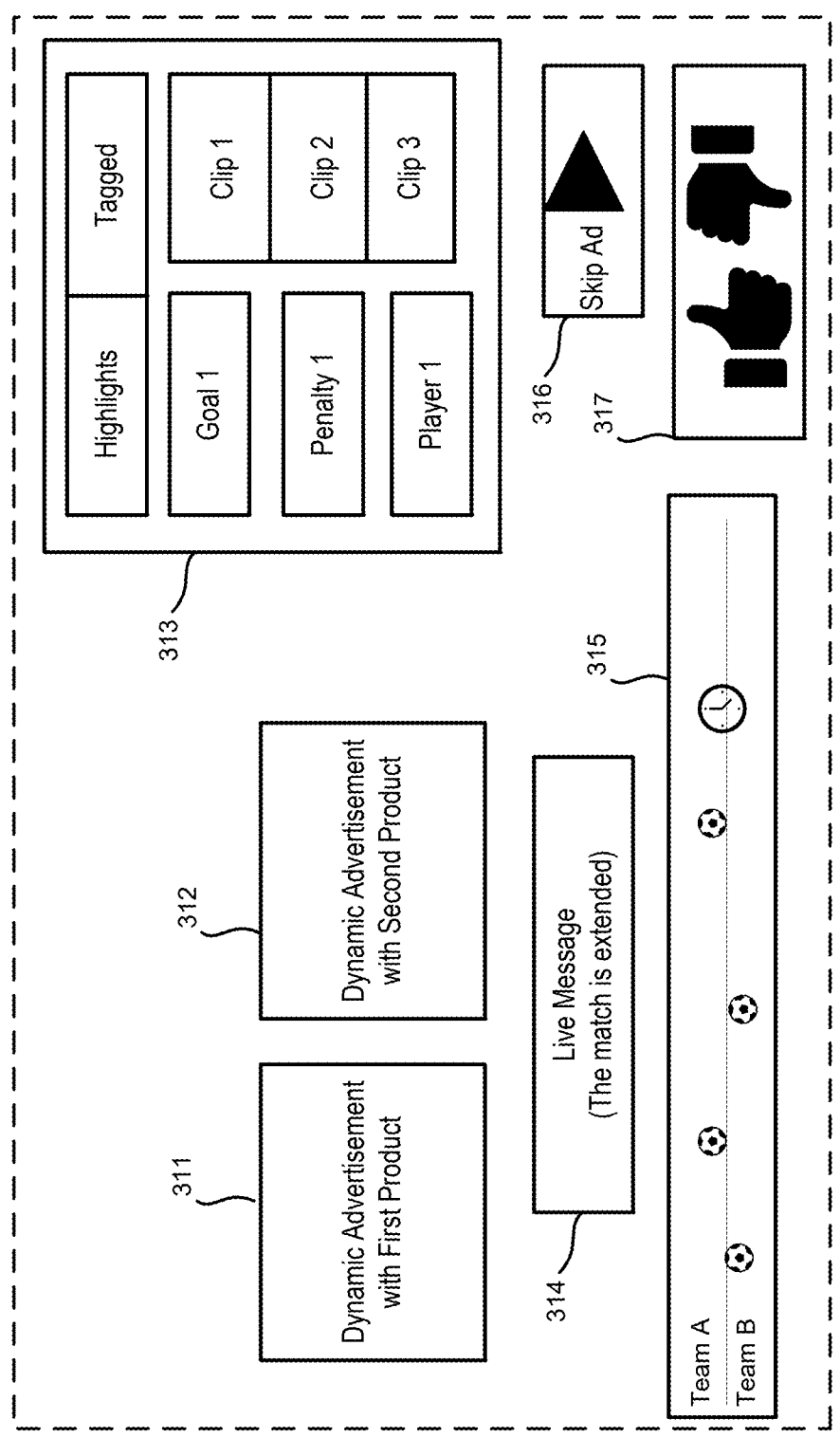
FIG. 3 is an example interface which may be displayed on a client device according to aspects of the disclosed technology.

FIG. 3 illustrates an example interface 310 that may be rendered on the client device 210. One or more of the illustrated components and/or elements of the example interface 310 may be rendered based on information which is obtained from metadata provided to the client device 210 (e.g., such as the manifest 212).

Element 311 may be an interactive element which is a dynamic advertisement, which may display a first product. The element 311 may contain a first product. The dynamic advertisement may include multimedia or text related to the first product. The element 311 may be clickable or otherwise may be interacted with. In some examples, the element 311 may only appear when the product is displayed as part of the underlying content.

Element 312 may be an interactive element which is a dynamic advertisement, which may display a second product. The element 312 may contain a second product. In some examples, the second product may be a variation of the product displayed with respect to element 311. In some examples, element 312 may display complementary information to what is displayed in element 311, such as pricing, availability, other colors, etc.

Element 313 may be an element which is configurable for various types of content. In an example, element 313 may be configured for a sports event. In the example given, the sports event may be a soccer match. Element 313 may be navigated by a user to allow the user to select "highlights", which may display short clips of the highlights of the soccer match so far (e.g., the first goal, the first penalty kick, the best scoring player so far, etc.). Element 313 may display live clips or thumbnails of the clips. Element 313 may also have tagged clips, which may include portions of clips which were most rewatched by users. For example, the timing analyzer 283 may provide the most watched portions of the match, and that information may be used to generate or provide those clips as metadata.

Element 314 is a "live message" element. This live message element may be an element which relates to the state of the underlying content. This live message element may also change. For example, as the match is extended, the live message element may change. In other examples, the live message element may provide other information related to the underlying content, such as for example, "last goal was 5 minutes ago".

Element 315 is a timeline element, which may show the start of the match, when various points or goals were obtained by either team (illustrated with soccer balls), the current time in the match (illustrated with a clock icon), and a line indicating the expected end time of the match.

Element 316 is a "skip ad" icon which may appear when it is possible for a user to skip an advertisement. Element 317 is a feedback icon, in which a user can indicate whether or not he is enjoying a particular show or content, or a portion thereof.

The various elements illustrated in FIG. 3 and on interface 310 may be derived and/or generated based on metadata and/or the manifest 212. Other features may also be included which are not illustrated with respect to FIG. 3 for clarity. For example, an "X-Ray" feature will allow for the identification and publication of cast and crew from a movie/series for the content being watched. Interface 310 may also allow for a survey loop to also be run, which can provide feedback to the computing system 202. The survey loop may be passively run and not actively shown on a user interface, and be initiated or run by a remote-control or voice activation feature. This feature may be toggled as on or off by a user as well as by his or her preferences. This feature may provide user feedback to help generate information for the most relevant or popular moments of the show. Later, this information may be combined with machine learning algorithms to customize the content of ads or metadata shown.

Figure 4:
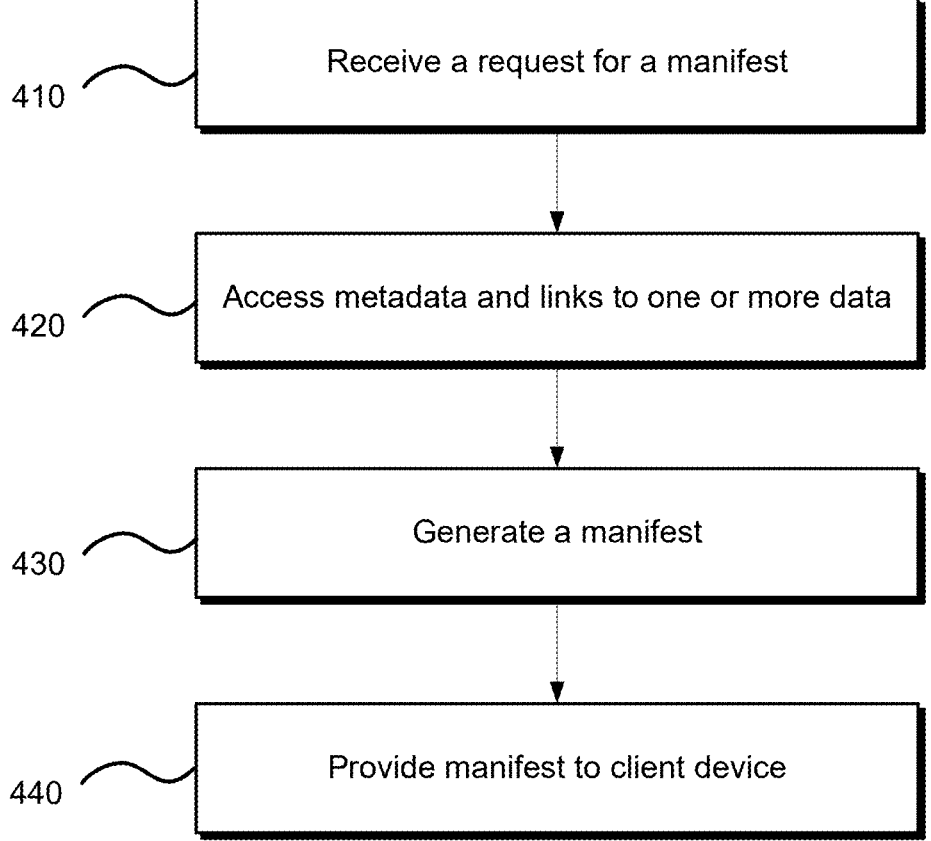
FIG. 4 depicts an example method according to aspects of the disclosed technology.

FIG. 4 illustrates a flowchart of a method 400 for providing a manifest to a client device. The method 400 may be performed by some or all of the systems and devices described herein. For example, the method 400 may be performed by the systems 100 and/or 200, working alone or in conjunction with each other. The steps of the method 400 may be performed in a different order than is shown and described, and/or some steps may be combined. In some embodiments, some steps may be skipped altogether.

At step 410, the method 400 may include, receiving a request for a manifest by a client device. For example, the computing system 202 may receive a request for the manifest. The request may contain information which can identify specific content and/or metadata associated with the content. The requested manifest may comprise links to one or more respective data files. In some examples, the manifest 112 may be provided to the client device 110 in response to a request from the client device 110. For example, the client device 110 may request the manifest 112 upon launching an application on the client device 110. The launched application on the client device 110 may be a content streaming application, allowing a user to access live TV, sports, movies, films, and other audio-visual and/or multimedia content. In some examples, a different manifest file may be requested by the client device 110 for different applications which may be contained in the client device 110. The manifest may provide both information related to the content and associated metadata and may also contain information related to the content server.

At step 420, the method 400 may include accessing, accessing metadata and/or links to the one or more data. The metadata may be associated with at least one of the one or more respective datafiles. This step may be performed by the insertion service 220. This step may be performed by metadata service 140, the metadata service 240, and/or the MIS 241. The metadata may be accessed or provided from one or more services, e.g., metadata curation services 291-299. The metadata may previously have been aggregated at a metadata aggregator (e.g., metadata aggregator 270) and added to a database (e.g., MIS store 260). The metadata aggregator 270 may deduplicate, combine, modify, temporarily store, check for updates, process missing portions, etc. of metadata which may receive from the one or more metadata curation services 291-299. The one or more unique content identifiers may be provided by and/or access through the content server 250. Each unique content identifier may be related to a link and/or metadata to at the content server 250. In some embodiments, each content at the content server 250 may be a data which is used to generate a manifest file.

At step 430, the method 400 may include generating, by the computing system, the manifest comprising the links to the one or more respective data files and the metadata. This step may be performed by the insertion service 220. In some examples, the insertion service 220 may be a manifest generator. However, in some examples, one or more components of the metadata service 240 may form a portion of and/or be the manifest generator. The metadata may previously have been aggregated at a metadata aggregator (e.g., metadata aggregator 270) and added to a database (e.g., MIS store 260). The manifest may be generated at the insertion service 120. In some examples, the insertion service 120 or the insertion service 220 may modify the metadata into a format and integrate and/or insert the data into a manifest, along with one or more unique content identifiers The manifest 212 may be a manifest file, which may be a file containing information for a group of accompanying files that are part of a set or coherent unit. The manifest 212 may be a variant manifest or a master manifest. The manifest 212 may provide both information related to the content and associated metadata. also contain information related to the content server. The manifest 212 may be provided based on a request the client device 210.

At step 440, the method 400 may include providing the manifest to the client device. For example, the manifest 212 may be transmitted to the client device 210. The manifest may include content and metadata, serving as a single source for both content delivery, metadata, and the inclusion of additional features with respect to the content. The metadata may include information which allows for skipping content, key moments, ad insertion, or other information. In some examples, the manifest may be stored in a database prior to delivery to the client device, such as a database which is distributed geographically.

In some embodiments, the metadata may also be interpreted by the client device to render an interface and/or render information contained within the metadata. The metadata may comprise information which may be used by the client device to display one of an information window or a user interface. A user interface which is generated and/or rendered based on the metadata may be configured to receive a user input. Example information windows and/or user interfaces are discussed above with respect to FIG. 3. The information window may comprise an advertisement. The metadata may also contain a timestamp and/or timing information, which may include a start time or an end time for displaying and/or rendering the metadata on the client device.

Figure 5:
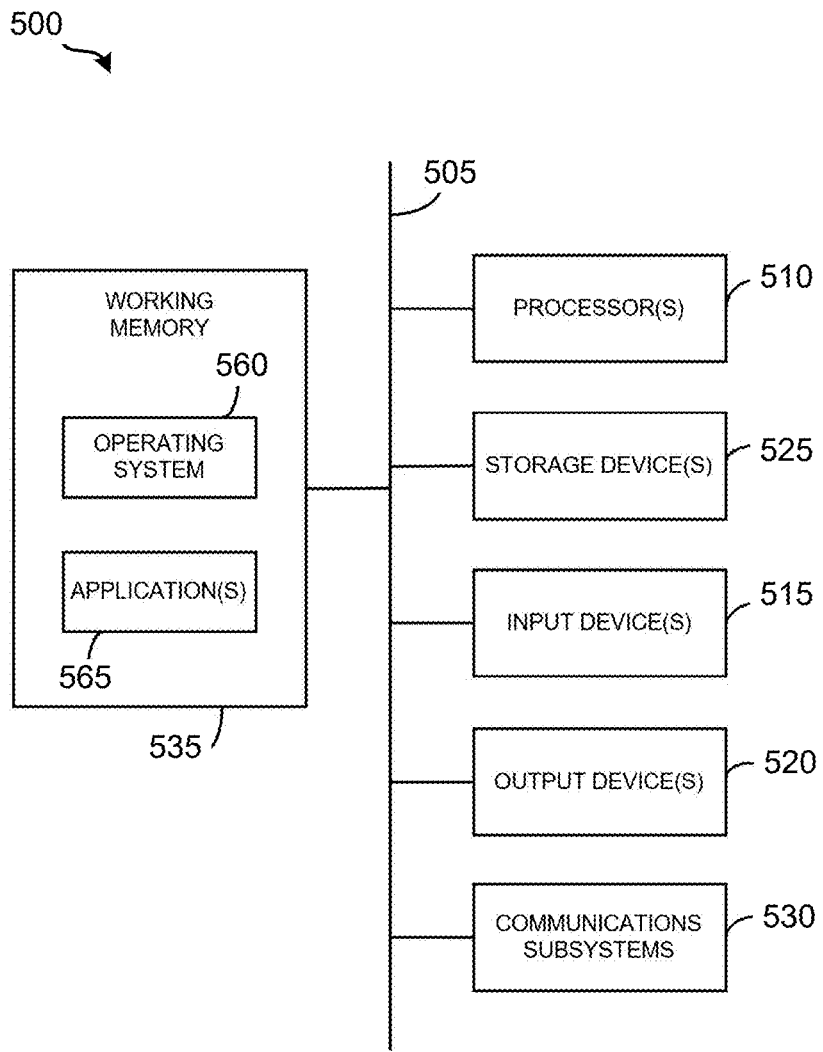
FIG. 5 depicts an example computer system according to aspects of the disclosed technology.

FIG. 5 is a schematic diagram illustrating an example of computer system 500. The computer system 500 is a simplified computer system that can be used to implement various embodiments described and illustrated herein. A computer system 500 as illustrated in FIG. 5 may be incorporated into devices such as a portable electronic device, mobile phone, or other device as described herein. FIG. 5 provides a schematic illustration of one embodiment of a computer system 500 that can perform some or all of the steps of the methods and workflows provided by various embodiments. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown including hardware elements that can be electrically coupled via a bus 505, or may otherwise be in communication, as appropriate. The hardware elements may include one or more processors 510, including without limitation one or more general-purpose processors and/or one or more special-purpose processors such as digital signal processing chips, graphics acceleration processors, and/or the like; one or more input devices 515, which can include without limitation a mouse, a keyboard, a camera, and/or the like; and one or more output devices 520, which can include without limitation a display device, a printer, and/or the like.

The computer system 500 may further include and/or be in communication with one or more non-transitory storage devices 525, which can include, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 500 might also include a communications subsystem 530, which can include without limitation a modem, a network card (wireless or wired), an infrared communication device, a wireless communication device, and/or a chipset such as a Bluetooth™ device, a 802.11 device, a Wi-Fi device, a Wi-Max device, cellular communication facilities, etc., and/or the like. The communications subsystem 530 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 530. In other embodiments, a portable electronic device, e.g., the first electronic device, may be incorporated into the computer system 500, e.g., an electronic device as an input device 515. In some embodiments, the computer system 500 will further include a working memory 535, which can include a RAM or ROM device, as described above.

The computer system 500 also can include software elements, shown as being currently located within the working memory 535, including an operating system 560, device drivers, executable libraries, and/or other code, such as one or more application programs 565, which may include computer programs provided by various embodiments, and/or may be designed to implement methods, and/or configure systems, provided by other embodiments, as described herein. Merely by way of example, one or more procedures described with respect to the methods discussed above, such as those described in relation to FIG. 5, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 525 described above. In some cases, the storage medium might be incorporated within a computer system, such as computer system 500. In other embodiments, the storage medium might be separate from a computer system e.g., a removable medium, such as a compact disc, and/or provided in an installation package, such that the storage medium can be used to program, configure, and/or adapt a general-purpose computer with the instructions/code stored thereon. These instructions might take the form of executable code, which is executable by the computer system 500 and/or might take the form of source and/or installable code, which, upon compilation and/or installation on the computer system 500 e.g., using any of a variety of generally available compilers, installation programs, compression/decompression utilities, etc., then takes the form of executable code.

It will be apparent that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 500 to perform methods in accordance with various embodiments of the technology. According to a set of embodiments, some or all of the operations of such methods are performed by the computer system 500 in response to processor 510 executing one or more sequences of one or more instructions, which might be incorporated into the operating system 560 and/or other code, such as an application program 565, contained in the working memory 535. Such instructions may be read into the working memory 535 from another computer-readable medium, such as one or more of the storage device(s) 525. Merely by way of example, execution of the sequences of instructions contained in the working memory 535 might cause the processor(s) 510 to perform one or more procedures of the methods described herein. Additionally, or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 500, various computer-readable media might be involved in providing instructions/code to processor(s) 510 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 525. Volatile media include, without limitation, dynamic memory, such as the working memory 535.

Common forms of physical and/or tangible computer-readable media include, for example, a floppy disk, a flexible disk, a hard disk, a magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500.

The communications subsystem 530 and/or components thereof generally will receive signals, and the bus 505 then might carry the signals and/or the data, instructions, etc. carried by the signals to the working memory 535, from which the processor(s) 510 retrieves and executes the instructions. The instructions received by the working memory 535 may optionally be stored on a non-transitory storage device 525 either before or after execution by the processor(s) 510.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

What is claimed is:

1. A method for dynamic metadata delivery in a content streaming service, comprising:

receiving, at a computing system and from a client device, a request for a manifest, the manifest comprising links to one or more respective data files;

accessing, by the computing system, metadata and the links to the one or more respective data files, the metadata associated with at least one of the one or more respective data files, wherein the metadata is based at least in part on: receiving data indicating a user interaction from the client device, the user interaction related to metadata or the one or more respective data files;

analyzing, by a machine learning model of the computing system, the user interaction, the machine learning model trained using an aggregate user behavior comprising a skip count and a rewatched count; and outputting, by the machine learning model, new metadata based on at least one of voice input, historical user data, or user interactivity data; generating, by the computing system, the manifest comprising the links to the one or more respective data files and the metadata; and providing the manifest to the client device.

2. The method of claim 1, wherein the metadata comprises information configured to be interpreted by the client device to render the metadata.

3. The method of claim 2, wherein the render of the metadata comprises rendering an interface.

4. The method of claim 1, wherein the metadata comprises location information indicating a location within content to display a user interface and/or an information window.

5. The method of claim 1, wherein the metadata comprises a timestamp indicating at least one of a start time or an end time.

6. The method of claim 1, further comprising storing the manifest in a metadata store of the computing system.

7. The method of claim 1, wherein the user interaction is an audio input.

8. The method of claim 7, further comprising processing, by the computing system, the audio input using natural language processing.

9. The method of claim 7, further comprising analyzing, by a machine learning model of the computing system, the user interaction.

10. The method of claim 9, further comprising outputting, by the machine learning model, new metadata based on at least one of voice input, historical user data, or user interactivity data.

11. The method of claim 10, further comprising retraining the machine learning model based on at least the new metadata.

12. A system for dynamic metadata delivery in a content streaming service, the system comprising:

a manifest generator;

a metadata service;

one or more processors;

and a computer memory comprising instructions that, when executed by the one or more processors, cause the system to perform operations comprising:

receiving, by the manifest generator and from a client device, a request for a manifest, the manifest comprising links to one or more respective data files;

accessing, by the metadata service, the links to the one or more respective data files and metadata, the metadata associated with at least one of the one or more respective data files, wherein the metadata is based at least in part on:

receiving data indicating a user interaction from the client device, the user interaction related to metadata or the one or more respective data files;

analyzing, by a machine learning model of the system, the user interaction, the machine learning model trained using an aggregate user behavior comprising a skip count and a rewatched count and outputting, by the machine learning model, new metadata based on at least one of voice input, historical user data, or user interactivity data;

generating, by the manifest generator, the manifest comprising the links to the one or more respective data files and the metadata; and providing, by the manifest generator, the manifest to the client device.

13. The system of claim 12, wherein the metadata comprises information to be used by the client device to display at least one of an information window or a user interface.

14. The system of claim 13, wherein the user interface is configured to receive a user input.

15. The system of claim 14, wherein the information window comprises an advertisement.

16. The system of claim 12, wherein the metadata service further comprises a machine learning model configured to output recommended metadata based on at least one of voice input, historical user data, or user interactivity data.

17. A non-transitory computer-readable medium containing instructions, that when executed by one or more processors, are configured to cause the one or more processors to perform operations comprising:

receiving, at a computing system and from a client device, a request for a manifest, the manifest comprising links to one or more respective data files;

accessing, by the computing system, the links to the one or more respective data files and metadata, the metadata comprising a timestamp and associated with at least one of the one or more respective data files, wherein the metadata is based at least in part on:

receiving data indicating a user interaction from the client device, the user interaction related to metadata or the one or more respective data files;

analyzing, by a machine learning model of the computing system, the user interaction, the machine learning model trained using an aggregate user behavior comprising a skip count and a rewatched count; and outputting, by the machine learning model, new metadata based on at least one of voice input, historical user data, or user interactivity data;

generating, by the computing system, the manifest comprising the links to the one or more respective data files and the metadata; and providing the manifest to the client device.

18. The non-transitory computer-readable medium containing instructions of claim 17, wherein the metadata comprises a timestamp indicating at least one of a start time or an end time.

* * * * *